United States Patent [19]
Allison

[11] Patent Number: 5,282,497
[45] Date of Patent: Feb. 1, 1994

[54] FUEL DELIVERY AND VAPOR CONTROL SYSTEM FOR CONTROLLING THE RELEASE OF FUEL VAPORS FROM A VEHICLE FUEL TANK

[76] Inventor: Allen Allison, 5437 Whitehall, W. Bloomfield, Mich. 48323

[21] Appl. No.: 965,233

[22] Filed: Oct. 23, 1992

[51] Int. Cl.⁵ .................. B65B 31/00; F16K 24/00
[52] U.S. Cl. ........................ 141/59; 141/45; 141/302; 137/588; 220/86.2
[58] Field of Search ............ 220/86.1, 86.2, 89.1; 137/587-589, 39, 43; 55/88, 587; 141/302, 59, 44-46

[56] References Cited

U.S. PATENT DOCUMENTS

| | | | |
|---|---|---|---|
| 4,699,638 | 10/1987 | Harris | 55/88 X |
| 4,724,861 | 2/1988 | Covert et al. | 141/59 X |
| 4,762,156 | 8/1988 | Rich | 141/46 |
| 4,869,283 | 9/1989 | Oeffling et al. | 137/43 |
| 4,874,020 | 10/1989 | Bucci | 141/59 |
| 4,966,299 | 10/1990 | Teets et al. | 141/46 X |
| 4,974,645 | 12/1990 | Johnson | 141/59 |
| 5,014,742 | 5/1991 | Covert et al. | 137/588 |
| 5,054,508 | 10/1991 | Benjey | 137/43 |
| 5,054,528 | 10/1991 | Saitoh | 141/59 |
| 5,183,087 | 2/1993 | Aubel et al. | 141/59 |

Primary Examiner—Ernest G. Cusick
Attorney, Agent, or Firm—Harness, Dickey & Pierce

[57] ABSTRACT

A fuel and vapor control system for motor vehicle applications is disclosed. The fuel and vapor control system regulates the refueling operation to maintain a sufficient vapor dome within the motor vehicle fuel tank to prevent over-filling thereof upon malfunction of a fuel nozzle's automatic shut-off mechanism. The fuel and vapor control system includes a first valve assembly for controlling the flow of fuel vapors to a vapor capture device, a second valve assembly for controlling actuation of the nozzle shut-off mechanism, and a third valve assembly for controlling the delivery of liquid fuel into the fuel tank in response to actuation of the first and second valve assemblies. A fourth valve assembly inhibits the emission of evaporative fuel vapors upon withdrawal of the nozzle from the fill pipe. The various valve assemblies cooperate to inhibit leakage of liquid fuel and vapors from the motor vehicle fuel system upon impact and/or the occurrence of a roll-over situation.

30 Claims, 7 Drawing Sheets

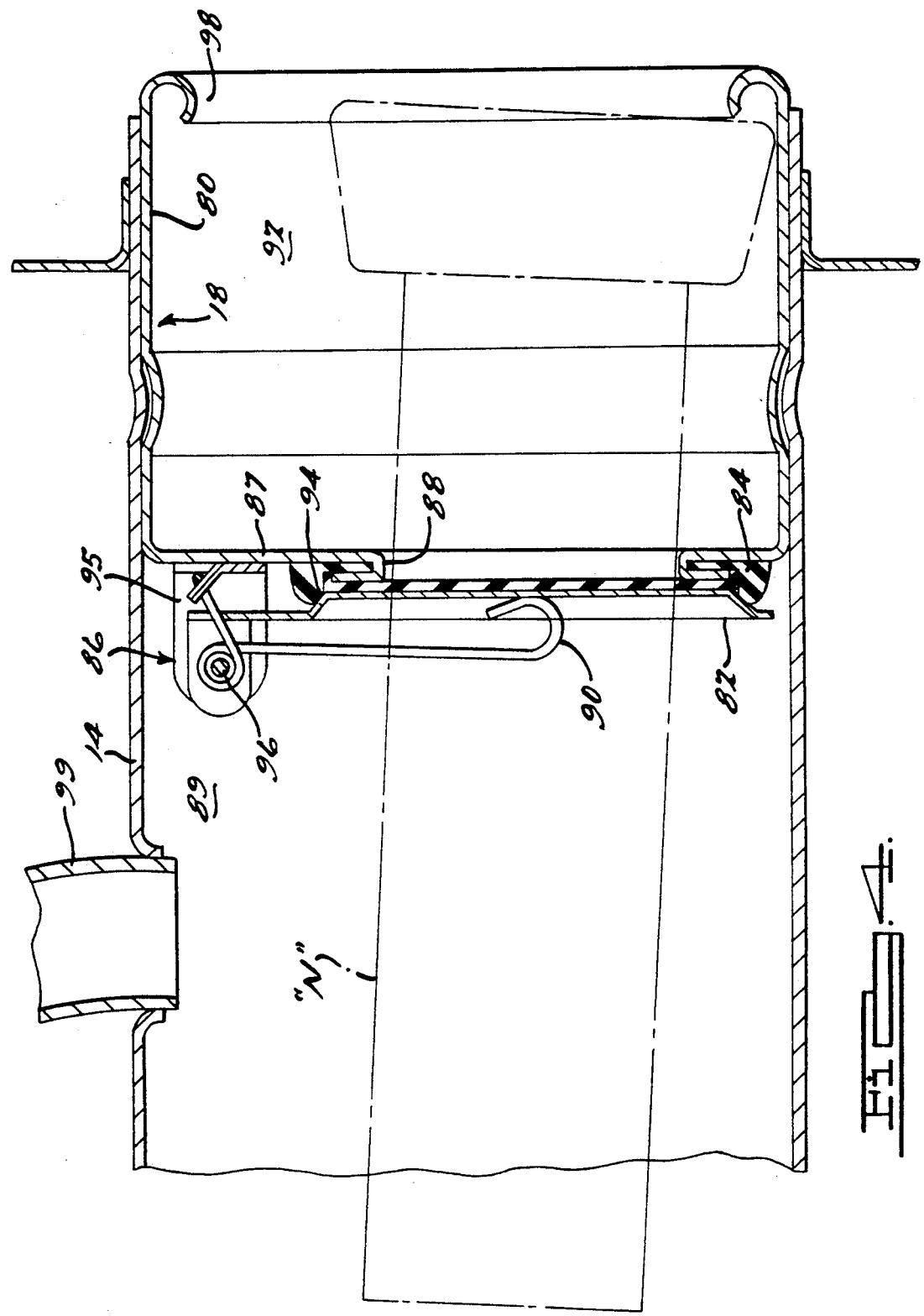

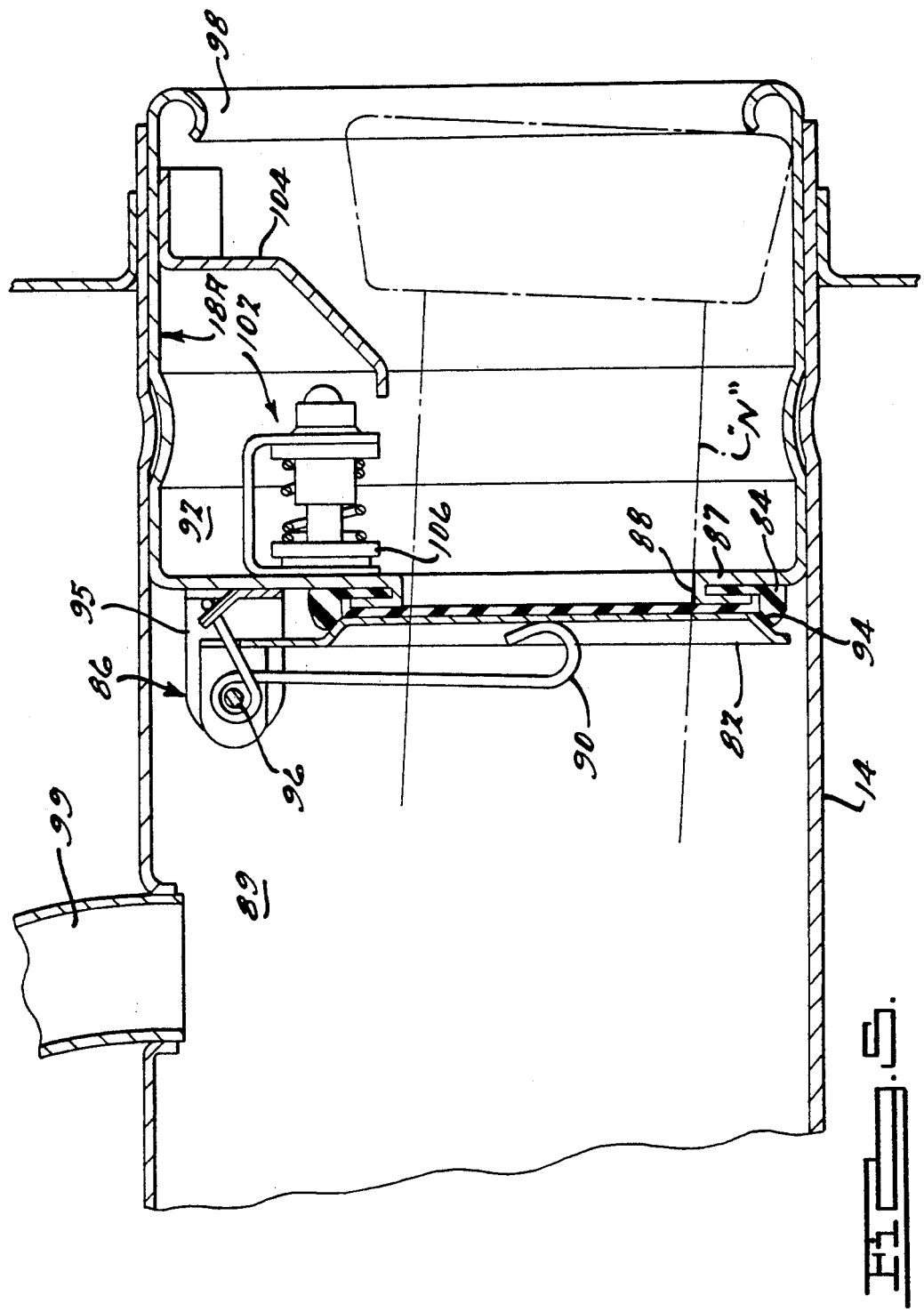

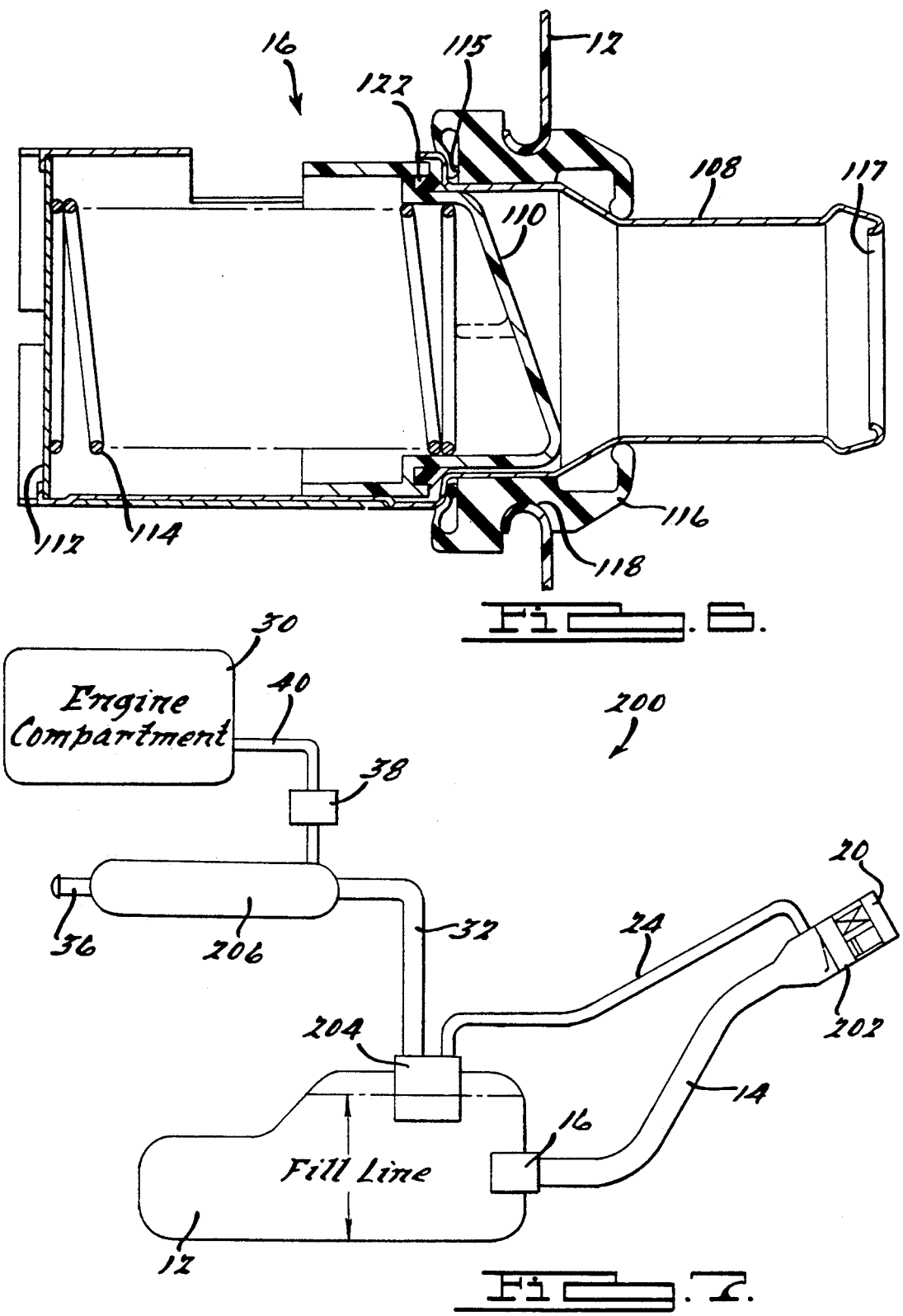

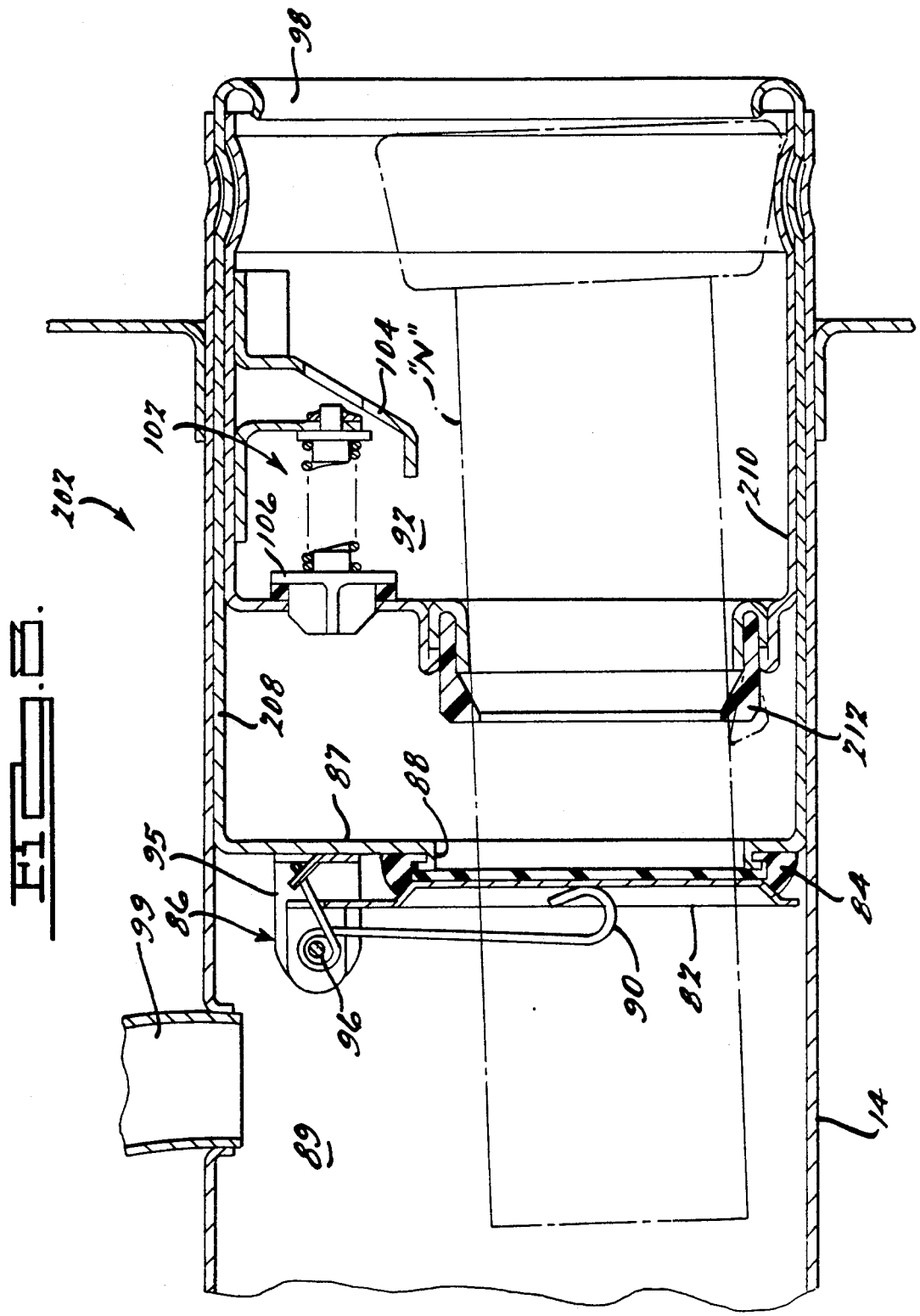

FUEL DELIVERY AND VAPOR CONTROL SYSTEM FOR CONTROLLING THE RELEASE OF FUEL VAPORS FROM A VEHICLE FUEL TANK

BACKGROUND OF THE INVENTION

The present invention relates generally to motor vehicle fuel filling systems and, more particularly, to a fuel and vapor control system for controlling the release of evaporative and running loss fuel vapors into the atmosphere.

In view of stringent environmental and safety regulations which significantly restrict the emission of non-combusted hydrocarbons (i.e. fuel vapors) into the atmosphere, emission control systems are incorporated into modern motor vehicles. These systems are adapted to prevent or substantially minimize the release of fuel vapors from the fuel tank and/or the fuel intake system of an internal combustion engine. Most conventional emission control systems use a vapor capture device, such as an activated charcoal canister, for absorbing or "trapping" evaporative emissions when the engine is shut off. Upon starting of the engine, the flow of filtered air through the charcoal canister purges the vapors therefrom such that the vapors are delivered to the intake system for combustion by the engine.

Unfortunately, vapor control systems incorporated into modern motor vehicles have become increasingly complex and expensive due to a number of critical design requirements. First, the fuel filling system must prevent leakage of fuel and vapors during both refueling and normal operation of the vehicle. In addition, the fuel filling system must allow for the entry of air to replace the fuel within the fuel tank as it is consumed, and must also allow for venting of over-pressure conditions within the tank. The fuel filling system must also provide means for actuating the automatic shut-off mechanism incorporated in fuel dispensing nozzles. Furthermore, the fuel filling system must inhibit the leakage of liquid fuel and vapors upon impact and during the occurrence of a "roll-over" accident. Finally, modern fuel filling systems must prevent the introduction of leaded fuels into the fuel tank of the vehicle.

Conventional fuel filling and vapor control systems permit pressurized fuel vapors present within the motor vehicle fuel system to escape to the atmosphere upon removal of the fuel cap. It will be appreciated that a significant quantity of otherwise combustible fuel is lost to the atmosphere each time a vehicle is refueled. In addition, new fuel vapors are continually generated during refueling due to splash and agitation of the dispensed fuel, as well as from extreme temperature differences between the fuel in the fuel tank and the newly dispensed fuel. Furthermore, as liquid fuel is delivered into the fuel tank, fuel vapors are displaced from the fuel tank's vapor space and are typically released directly into the atmosphere through the fuel tank filler neck.

Another drawback associated with most conventional fuel filling systems is that over-filling of the fuel tank is not monitored and regulated. If the nozzle shut-off mechanism fails to terminate delivery of liquid fuel into the fuel tank, fuel will eventually back-up the fill pipe and spill onto the ground for alerting the operator to manually shut-off the nozzle. However, such over-filling of the fuel tank displaces the required "vapor dome" located above the desired maximum fill level of the fuel tank which can potentially cause fuel leakage during vehicle operation and/or contamination of the activated charcoal canister. In addition, lack of an adequate "vapor dome" within the fuel tank can also cause excessively high tank pressures due to extreme variations in the fuel temperature and volatility.

SUMMARY OF THE INVENTION

Accordingly, it is a primary object of the present invention to meet all of the above named fuel filling system requirements while overcoming the various disadvantages associated with conventional systems. In a related object, the present invention is directed to a vapor control system provided for substantially minimizing the escape of "evaporative" and "running loss" fuel vapors from the fuel system.

Another object of the present invention is to provide a motor vehicle fuel and vapor control system that conforms to all governmental, environmental and safety regulations regarding evaporative and refueling emissions, and vehicle impact, while generating enhanced customer satisfaction.

According to a preferred embodiment of the present invention, the fuel and vapor control system is adapted to regulate the refueling operation for maintaining a sufficient "vapor dome" within the fuel tank to prevent over-filling of the fuel tank upon malfunction of the nozzle's automatic shut-off mechanism. More particularly, the fuel and vapor control system of the present invention includes first valve means for controlling the flow of fuel vapors to a vapor capture device, second valve means for controlling actuation of the nozzle shut-off mechanism, third valve means for controlling the delivery of liquid fuel into the fuel tank in response to actuation of the first and second valve means, and fourth valve means associated with a fill pipe restrictor assembly for inhibiting the emission of evaporative fuel vapors upon withdrawal of the nozzle therefrom. Furthermore, the first, second, third and fourth valve means cooperate to inhibit leakage of liquid fuel and vapors from the motor vehicle fuel system upon impact and/or the occurrence of a roll-over accident.

Additional objects, features, and advantages of the present invention will become apparent to those skilled in the art upon consideration of the following detailed description of the preferred embodiments exemplifying the best mode of carrying out the invention as presently perceived.

BRIEF DESCRIPTION OF THE DRAWINGS

FIG. 4 is a section view of a cap-less restrictor assembly secured to one end of the fill pipe incorporated into the fuel and vapor control system of FIG. 1;

FIG. 5 is a section view, similar to FIG. 4, illustrating an alternative embodiment of a cap-less restrictor assembly for use in the fuel and vapor control system of FIG. 1;

FIG. 6 is a section view of a tank spud assembly provided for interconnecting a second end of the fill pipe to the fuel tank;

FIG. 7 is a diagrammatic view of a motor vehicle fuel system incorporating a fuel and vapor control system arranged according to a second preferred embodiment of the present invention; and FIG. 8 is a section view of a modified cap-less restrictor assembly incorporated into the fuel and vapor control system of FIG. 7.

DETAILED DESCRIPTION OF THE PREFERRED EMBODIMENTS

Figure 1:
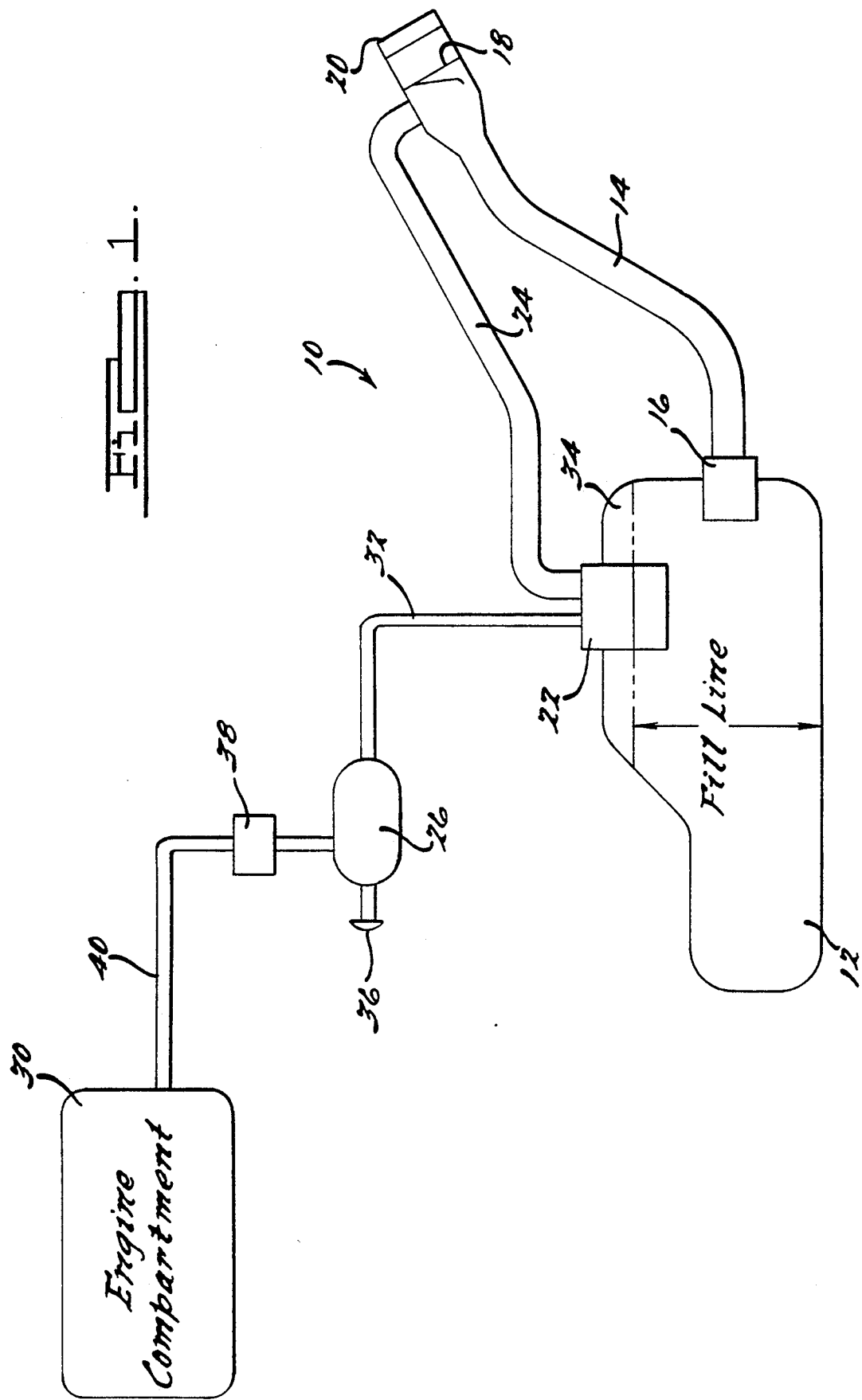
FIG. 1 is a diagrammatic view of a motor vehicle fuel system incorporating a fuel and vapor control system arranged according to a first preferred embodiment of the present invention.
Figure 2:
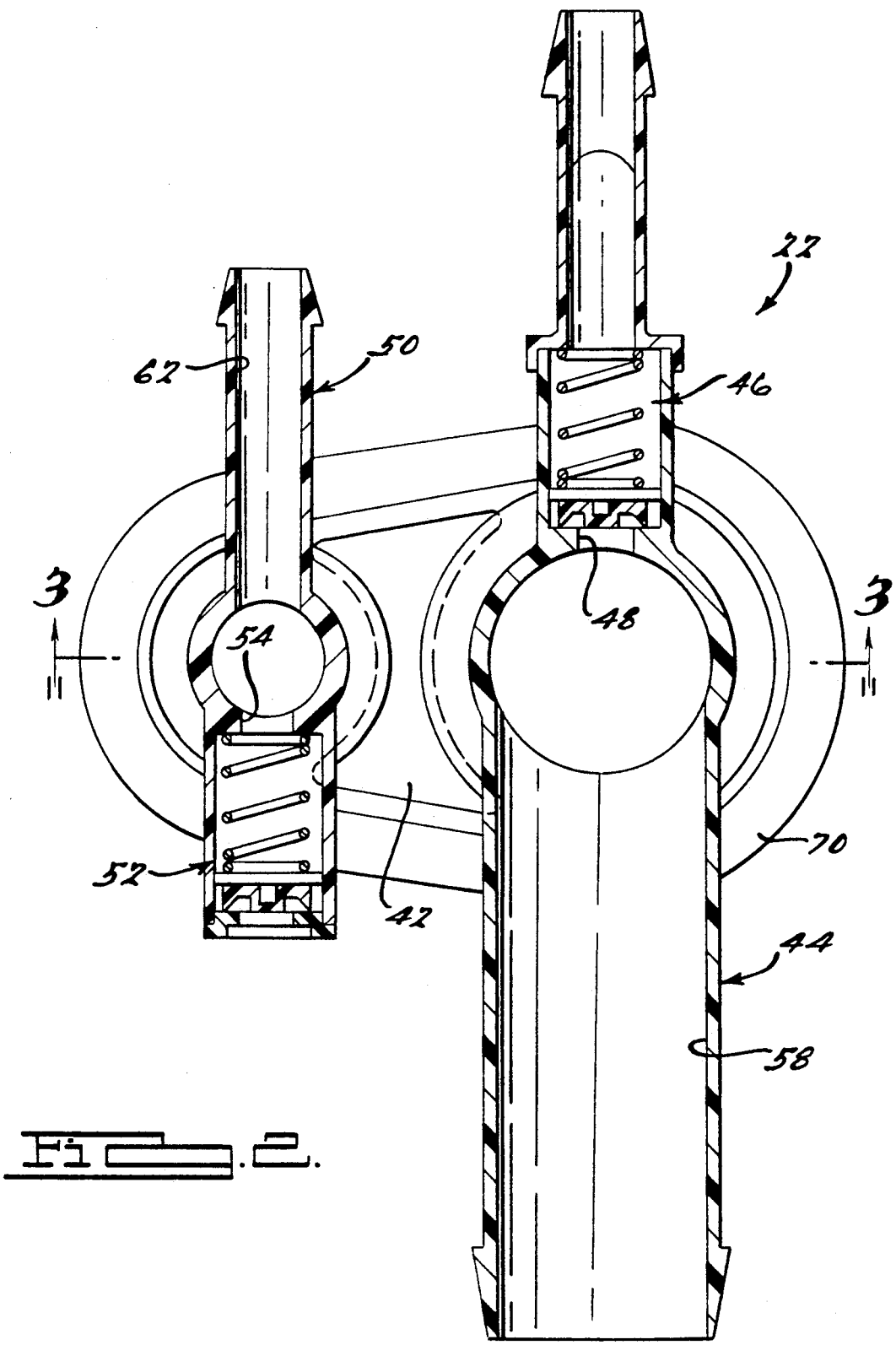
FIG. 2 is a top elevational view of a control valve assembly associated with the fuel and vapor control system of FIG. 1.

With particular reference to FIGS. 1 through 6, a first preferred embodiment of a fuel vapor and control system 10 (hereinafter referred to as control system 10) is disclosed. As is diagrammatically shown in FIG. 1, control system 10 includes a fuel tank 12, a fill pipe 14, a tank spud assembly 16, a cap-less restrictor assembly 18, a dirt cover 20, a control valve assembly 22 and a nozzle signal conduit or line 24. Control system 10 is adapted to be operatively connected to a vapor recovery device 26 and an internal combustion engine 30 via a vapor conduit or line 32. Vapor line 32 provides a fluid communication path between the fuel vapor present in a vapor dome 34 of fuel tank 12 and vapor recovery device 26 for eventual transfer to the fuel intake system of engine 30. Vapor dome 34 allows the fuel stored in fuel tank 12 to expand due to temperature and volatility variations without causing an over-pressure condition therein. It is to be understood that the phrase "fluid communication" is intended to indicate the transfer of at least one of the liquid fuel and the fuel vapor.

In general, control system 10 is operable to transfer a substantial portion of the evaporative fuel vapors displaced by liquid fuel delivered to fill tank 12 and/or generated during refueling to vapor recovery device 26 for permitting substantially complete combustion in engine 30. In addition, control system 10 includes means for permitting "running loss" vapors to be routed to vapor recovery device 26. Running loss vapors are those fuel vapors generated by the fuel splashing around within fuel tank 12 during normal operation of the motor vehicle. In this manner, the pressure of the vapors within vapor dome 34 can be regulated during operation of the motor vehicle.

Preferably, vapor recovery device 26 is a sealed canister filled with activated charcoal that is normally vented to the atmosphere via vent 36. The large surface area of the charcoal absorbs the hydrocarbons in the fuel vapors, while allowing the air to escape through vent 36. Furthermore, a purge line 40 provides a fluid communication path between charcoal canister 26 and the intake manifold vacuum of internal combustion engine 30 and is selectively controlled by a flow control valve 38. When the flow control valve 38 is closed, canister 26 absorbs the fuel vapors drawn from vapor dome 34. When flow control valve 38 is open, the absorption process is reversed such that the manifold vacuum draws fresh air in through canister vent 36 and past the charcoal, for releasing the absorbed hydrocarbons. This mixture of air and hydrocarbons is drawn through purge line 40 and into the intake manifold to be burnt along with a normally aspirated fuel mixture within engine 30.

A portion of control valve assembly 22 is disposed within the fuel tank 12 to partially extend below a predetermined maximum fuel level or "fill line" of fuel tank 12. As best seen from FIGS. 2 and 3, control valve assembly 22 includes a main housing 42, nozzle signal fitting 44, a pressure relief valve assembly 46 which is supported within a pressure relief port 48 formed in nozzle signal 44, a canister fitting 50, a vacuum relief valve assembly 52 which is supported within a vacuum relief port 54 formed in canister fitting 50, and valve means for controlling the flow of fuel vapors from vapor dome 34 into fittings 44 and 50, respectively.

In general, control valve assembly 22 functions as two independent "normally open" valve assemblies for controlling the flow of fuel vapors within vapor dome 34 between a first flow passage 56 and a nozzle signal port 58, and between a second flow passage 60 and a canister port 62. More particularly, nozzle signal port 58 is coupled to a first end of nozzle signal line 24. Pressure relief port 48 is fluidly connected to a first end of a leak line (not shown) the second end of which is preferably connected inside the fender area of the motor vehicle for permitting limited fuel and vapor leakage upon actuation of pressure relief valve assembly 46. Pressure relief valve assembly 46 is a safety feature which permits excessive pressure within fuel tank 12 to be vented through relief port 48. More specifically, pressure relief valve 46 is a normally closed valve apparatus which is opened in response to the tank pressure acting thereon when the pressure exceeds a predetermined level.

Canister port 62 is adapted to be connected to a first end of vapor line 32. The second end of vapor line 32 is connected to charcoal canister 26. Vacuum relief valve assembly 52 is provided to permit fresh air to enter relief port 54 for purging vapors from canister port 62 while preventing the escape of vapors therethrough to the atmosphere. It will be appreciated, that pressure relief valve assembly 46 and vacuum relief valve assembly 52 can be of any suitable type currently known in the art.

Figure 3:
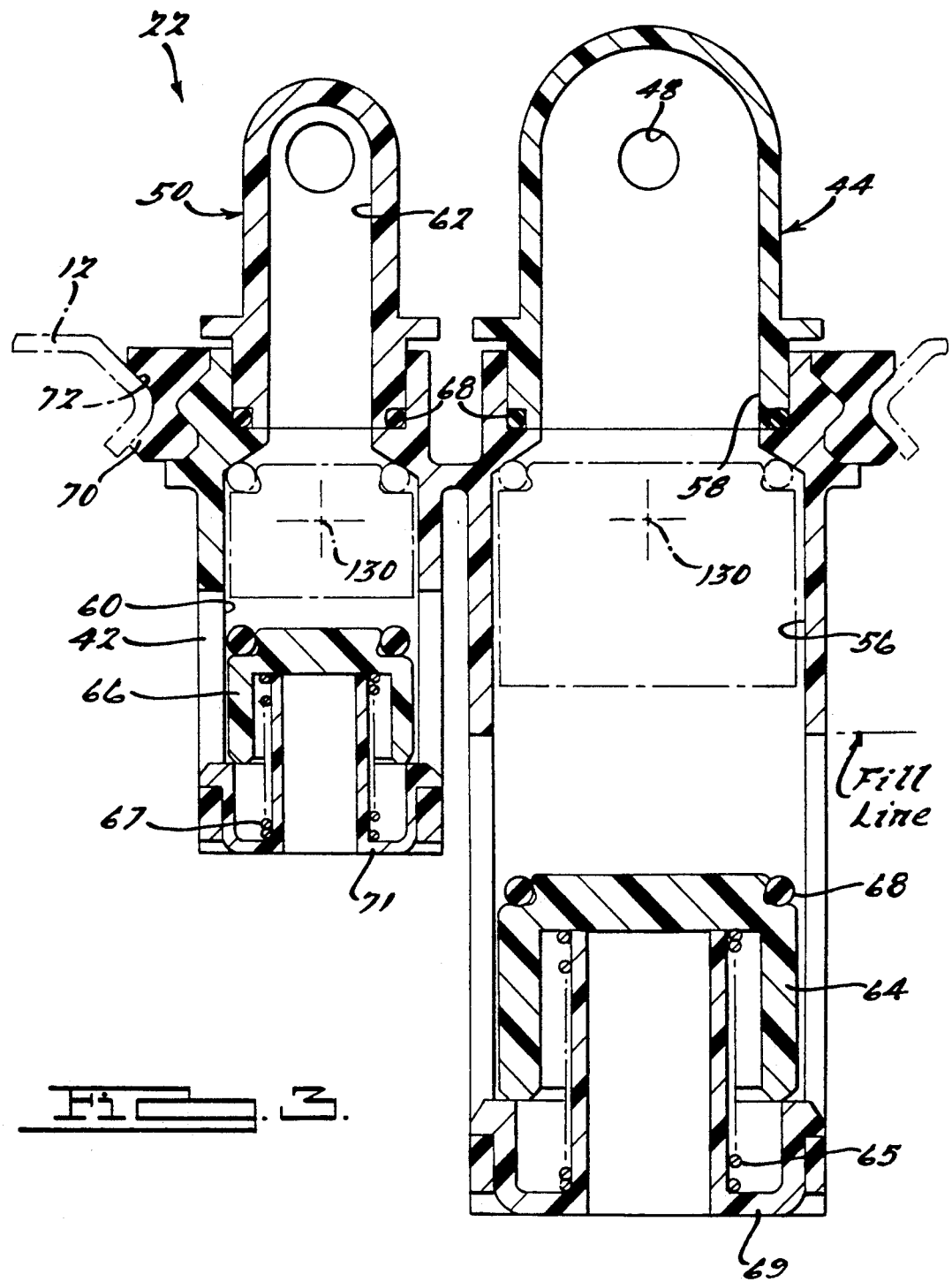
FIG. 3 is a section view of the control valve assembly taken along line 3—3 of FIG. 2.

With particular reference now to FIG. 3, the valve means of control valve assembly 22 includes roll over-/over-fill valve members 64 and 66, respectively, which are supported within housing 42 for movement between a "normally open" position and a "closed" position. More specifically, in the normally open position roll-over/over-fill valve member 64 permits fuel vapors stored in vapor dome 34 to flow from first flow passage 56 to signal port 58 and, in the closed position valve member 64 inhibits the flow of vapors therebetween. Likewise, in the open position roll-over/over-fill valve member 66 permits vapors stored in vapor dome 34 to flow from second flow passage 60 to canister port 62 while inhibiting flow therebetween when valve member 66 is in the closed position.

Valve members 64 and 66 are independently displaced toward the closed position by the rising level of liquid fuel within fuel tank 12 or upon excessive angular movement of control valve assembly 22 (i.e. upon roll-over). In addition, biasing means, shown as first and second coil springs 65 and 67, are provided intermediate stationary retainers 69 and 71 for exerting a biasing force on valve members 64 and 66, respectively.

An annular o-ring seal member 68 is disposed between main housing 42 and each of nozzle signal fitting 44 and canister fitting 50 to form a fluid-tight sealed engagement therebetween. An annular tank seal member 70 surrounds the perimeter of main housing 42 for providing a fluid-tight seal between control valve assembly 22 and fuel tank 12. Preferably, tank seal 70 engages the curled surface of an aperture 72 formed in an upper surface of fuel tank 12 and is adapted to swell upon exposure to liquid fuel for securely affixing control valve assembly 22 to fuel tank 12.

With reference now to FIG. 4, cap-less restrictor assembly 18 is shown to include a tubular restrictor 80, a splash door 82, an annular door seal 84, and a mounting bracket 86. Restrictor 80 is concentrically mounted and fixedly secured within the open top or "mouth" end of fill pipe 14 and includes a radially inwardly extending flange 87 defining a nozzle opening 88. Nozzle opening 88 is sized to only permit an "unleaded" fuel nozzle "N" to be inserted therethrough into an interior chamber 89 of fill pipe 14. Thus, a leaded fuel nozzle will be unable to enter nozzle opening 88 for pivotably deflecting splash door 82. In addition, splash door 82 is held in the "normally closed" position shown due to the biasing of an elongated torsion spring 90 acting thereon such that splash door 82 acts as a "backsplash" member causing leaded fuel dispensed from a larger diameter "lead" fuel nozzle inserted into exterior chamber 92 to splash back and automatically shut-off the delivery of fuel from the leaded nozzle. Thus, tubular restrictor 80 and splash door 82 coact to prevent the introduction of leaded fuels into fuel tank 12.

Door 82 is preferably fabricated from a relatively rigid material and has a radially recessed or embossed portion defining a generally frusto-conical surface 94 which is adapted to sealingly engage a raised portion of door seal 84. Preferably, door seal 84 is made from an elastomeric material which is insensitive to the corrosive effects of the fuel. Bracket 86 is mounted within interior chamber 89 to a backside surface of restrictor flange 87 and includes spaced flanges 95 which pivotably support one end of splash door 82 therebetween. More particularly, door 82 is pivotally mounted via an elongated hinge pin 96 extending between flanges 95. As noted, torsion spring 90 acts on a back side surface of door 82 for biasing door 82 into contact with door seal 84 to define the "normally closed" position shown in FIG. 4. The second end of splash door 82 is unsupported and is free to deflect out of the way when fuel pump nozzle "N" is inserted. Therefore, restrictor assembly 18 acts as a normally closed valve assembly for restricting introduction of leaded fuels into fuel tank 12 and for inhibiting the evaporative loss of fuel vapors from interior chamber 89 of fill pipe 14 upon removal of unleaded nozzle "N" from nozzle opening 88.

With continued reference to FIG. 4, the terminal end of restrictor assembly 18 is shown to include an inwardly curled sealing lip 98 which is adapted to be enclosed by non-threaded dirt cover 20. Curled sealing lip 96 is adapted to accept either a Stage I (i.e. standard) or Stage II unleaded nozzle to comply with all fuel filling regulations. In this manner, the use of an expensive conventional fuel cap with its seal and integral pressure and vacuum relief valving can be replaced with dirt cover 20 since splash door 82 is maintained in its normally closed position for sealing exterior chamber 92 and, in turn, the atmosphere from evaporative fuel vapors located in interior chamber 89 of fill pipe 14. In addition, a port 99, located within interior chamber 89, is provided for fluidly interconnecting a second end of nozzle signal line 24 to fill pipe 14. As such, fuel vapors confined within vapor dome 34 and signal line 24 are likewise inhibited from evaporative release to the atmosphere. Port 99 is operatively located such that as the fuel level in fuel tank 12 approaches the "fill line", the rushing vapors pick up and carry liquid fuel through nozzle signal line 24. This "spray" signals the nozzle shut-off mechanism to terminate the delivery of fuel into fill pipe 14 in a known manner.

FIG. 5 illustrates an alternative cap-less restrictor assembly 18A which is substantially identical to that shown in FIG. 4 with the addition of a pressure relief valve assembly 102 and a deflector shield 104. Pressure relief valve 102 includes a valve member 106 which is movable between the normally closed position shown and an open position with respect to an orifice (not shown) formed through radial flange 87 of tubular restrictor 18A. Deflector 106 is provided for shielding relief valve 102 upon insertion of nozzle "N" into chamber 92 for directing the nozzle toward nozzle opening 88. Pressure relief valve assembly 102 is adapted to permit the emission of residual fuel vapors from chamber 89 to relieve the pressure within fill pipe 14 when the liquid fuel is being dispensed at a standard nozzle pressure and flow rate (about 8 gal./min.).

With particular reference now to FIG. 6, tank spud assembly 16 is shown which is adapted to interconnect a lower terminal end of fill pipe 14 with fuel tank 12 for permitting the vehicle operator to add fuel into fuel tank 12. Tank spud assembly 16 includes a tank spud pipe 108, a movable valve member 110, and stationary retainer plate 112. In addition, spring biasing means, such as spring 114, is provided for normally biasing valve member 110 against a valve seat 115 formed on tank spud pipe 108 so as to define a "normally closed" position. Tank spud pipe 108 has a rolled nipple end 117 adapted to be received within fill pipe 14. Means are provided for securely affixing spud pipe 108 to fill pipe 14 to define a fluid-tight seal therebetween. Spud pipe 108 is surrounded by a elastomeric seal member 116 which is adapted to engage a curled-in opening 118 extending through a side surface of fuel tank 12 for lockingly sealing tank spud pipe 108 partially within fuel tank 12. An annular valve seal 122 surrounds valve member 110 and is adapted to seat against valve seat 115.

Tank spud assembly 16 functions as a "normally closed" valve assembly for inhibiting over-filling of fuel tank 12 in response to a corresponding pressure increase within fuel tank 12. When the fuel level in fuel tank 12 is below the predetermined "fill line" level, valve member 110 is displaced from valve seat 115 for permitting liquid fuel to enter fuel tank 12. However, when the fuel level within fuel tank 12 exceeds the maximum full level, valve members 64 and 66 are located in their closed positions whereby an increase in the pressure within fuel tank 12 is generated upon continued refueling due to compression of the fuel vapors in vapor dome 34. This increased pressure within fuel tank 12 causes valve member 110 to move into sealed engagement with valve seat 115. Furthermore, valve member 110 also acts as a roll-over valve for inhibiting leakage of liquid from fuel tank 12 upon a roll-over accident.

When the vehicle operator desires to add fuel to fuel tank 12, dirt cover 20 is removed. Vapors trapped in fill pipe 14 and signal line 24 which have not been directed to canister 26 are not allowed to escape to the atmosphere due to the sealing engagement of splash door 82 against door seal 84 for blocking nozzle opening 88. Therefore, until an "unleaded" nozzle "N" pushes splash door 82 open, vapors within fuel tank 12 are only vented through charcoal canister 26. When splash door 82 is opened upon insertion of nozzle "N" through nozzle opening 88, a minimal amount of residual fuel vapors is permitted to escape to exterior chamber 92 and, in turn, to the atmosphere. Upon actuation of the fuel nozzle, fuel is delivered to fill pipe 14 and air is drawn from exterior chamber 92 through nozzle opening 88 and into fill pipe 14. The rising fuel level in tank 12 acts to displace the vapors travelling through signal line 24 which eventually escape through nozzle opening 88 to the atmosphere. Concurrently, the rising level of the liquid fuel tank 12 also causes roll over/over-fill valve members 64 and 66 to each move upwardly toward their respective valve seats.

According to the present invention, valve member 66, associated with canister fitting 50, is positioned to seal against its valve seat to insure that liquid fuel does not reach charcoal canister 26 through vapor line 32. This sealing action occurs prior to valve member 64 closing off signal line 24 such that upon continued filling of fuel tank 12, the refueling vapors and vapor confined in vapor dome 34 are only directed through nozzle signal port 58 for picking-up and carrying the fuel "spray" through signal line 24 to actuate the nozzle shut-off mechanism in a known manner. As such, the nozzle shut-off mechanism is adapted to be "triggered" when the desired fuel level within fuel tank 12 is obtained. Thereafter, if the liquid fuel level in fuel tank 12 continues to rise, due to failure of the nozzle's shut off mechanism, valve member 64 will continue to rise toward its sealed position. When valve member 64 has blocked flow between first flow passage 56 and nozzle signal port 58 of nozzle signal fitting 44, pressure within nozzle signal line 24 decreases substantially for maintaining valve member 64 in the closed position for completely sealing off nozzle signal port 58. Since both valve ports 58 and 62 are now closed, the pressure within fuel tank 12 builds up relatively quickly which, in turn, acts on spud valve member 110 for closing tank spud assembly 16. In this manner, the fuel control system 10 maintains vapor dome 34 within fuel tank 12 by preventing over-filling of fuel tank 12. Thereafter, liquid fuel will back-up in fill pipe 14 behind spud valve assembly 16 and escape around nozzle "N" so as to alert the vehicle operator to manually shut off the nozzle.

Once fuel tank 12 is full (i.e. to the "fill line" level with the desired "vapor dome" 34 retained) and the nozzle has shut-off, hinged splash door 82 of restrictor assembly 18 (or 18A) seals off fill pipe 14 as nozzle "N" is withdrawn therefrom for minimizing evaporative losses. With fuel tank 12 filled, fuel tank bleed orifices 130 allow running loss vapors to travel around members 64 and 66 for reducing the pressure within fuel tank 12. Thereafter, once the pressure within fuel tank 12 is relieved, valve members 64 and 66 drop back to their "normally opened" position such that "running loss" fuel vapors are routed to canister 26 during normal vehicle operation. Fuel trapped in fill pipe 14 will eventually reach fuel tank 12, due to vibrations which open spud valve assembly 16 for allowing fuel to drain into fuel tank 12 from fill pipe 14.

The present invention is also adapted to prevent leakage of fuel upon occurrence of a vehicle "roll-over" situation. More particularly, the upper portion of fill pipe 14 is sealed by splash door 82 while the bottom of fill pipe 14 is sealed by spud valve assembly 16. In addition, prior to the vehicle rolling substantially about its axis, valve members 64 and 66 of control valve assembly 22 move to their closed positions for blocking off signal and canister ports 58 and 62, respectively. After the vehicle is set back on its wheels, the weight of valve members 64 and 66 acts to compress their biasing means for exposing vacuum relief valve assembly 52 and pressure relief valve assembly 46 for venting any excessive tank pressure generated during the roll-over occurrence.

In accordance with an alternative embodiment of the present invention, a fuel vapor and control system 200 is disclosed. Control system 200 is diagrammatically shown in FIG. 7 and includes several of the components described here before. As such, like numbers are used to designate like or corresponding components. In general, control system 200 incorporates a modified capless restrictor assembly 202 and a modified control valve assembly 204, both of which are generally configured and arranged for substitution for their counterpart components previously described. In general, modified control valve assembly 204 is substantially identical to control valve assembly 22 with the exception that the overall sizing of its nozzle signal fitting and its canister fitting is modified to accommodate interconnection of control valve assembly 204 to a larger capacity vapor recovery device 206. However, control valve assembly 204 and vapor recovery device 206 both function in a substantially identical fashion to that described herebefore in reference to control valve assembly 22 and charcoal canister 26, respectively.

With particular reference now to FIG. 8, the modified cap-less restrictor assembly 202 associated with control system 200 is shown in greater detail. In general, restrictor assembly 202 is a tubular dual-wall apparatus concentrically secured within the "mouth" end of filler pipe 14. An outer tubular wall 208 of dual-wall restrictor assembly 202 is substantially identical to restrictor assembly 18. More particularly, outer tubular wall 208 is a restrictor having radial flange 87 from which splash door 82, annular door seal 84, mounting bracket 86 and torsion spring 90 are supported for defining the "normally closed" back-splash door assembly. An inner tubular wall member 210 supports an annular nozzle seal 212, a pressure relief valve assembly 102 and a vacuum relief valve (not shown). As previously described, splash door 82 and nozzle opening 88 are coactive to prevent the delivery of leaded fuel to fuel tank 12 as well as for sealing interior chamber 89 of fill pipe 14 and signal line 24 from loss of evaporative emissions upon withdrawal of nozzle "N" from nozzle opening 88.

Located forward of back splash door 82, is elastomeric nozzle seal 212 which is adapted to resiliently and sealingly engage the exterior periphery of nozzle "N" upon insertion therethrough prior to engagement with back splash door 82. Once nozzle "N" is inserted through nozzle opening 88, the rushing liquid fuel dispensed therefrom creates a vacuum behind nozzle seal 212 in chamber 89. As such, the vacuum relief valve assembly permits air to be drawn into chamber 89 from exterior chamber 92 during the refueling process while preventing the escape of vapors therefrom. In this manner, premature triggering of the nozzle shut-off mechanism due to the existence of a vacuum is eliminated.

According to this second embodiment of the present invention, refueling vapors displaced by the rising fuel in fuel tank 12 do not travel through nozzle signal line 24 for escape to the atmosphere. Instead, the refueling vapors are directed through control valve assembly 204 so as to be drawn directly into charcoal canister 206. As noted, the function of the larger charcoal canister 206 is substantially identical to that previously described herein. In addition, due to the addition of nozzle seal 212, liquid fuel backing up in fill pipe 14 following closure of tank spud assembly 16 cannot escape around the nozzle "N". Therefore, pressure relief valve assembly 102 is operable to move valve member 106 to an open position for allowing the liquid fuel to escape so as to alert the vehicle operator of the failure of the nozzle shut-off mechanism.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A motor vehicle fuel filling system comprising:
   a fuel tank;
   a remotely located vapor capture device;
   a first communication path for carrying fuel vapors confined within said fuel tank to said vapor capture device;
   first valve means for permitting the flow of fuel vapors through said first communication path when the level of liquid fuel stored within said fuel tank is below a predetermined maximum level, said first valve means inhibiting flow of vapors and liquid fuel through said first communication path when said fuel stored in said fuel tank equals or exceeds said maximum level;
   a fill pipe coupled to said fuel tank and operable for delivering liquid fuel to said fuel tank;
   a restrictor device secured to a first end of said fill pipe and having a nozzle opening sized to permit insertion of an unleaded fuel nozzle therethrough;
   a second communication path for carrying fuel vapors and liquid from said fuel tank to said fill pipe for controlling actuation of a shut-off device associated with said unleaded fuel nozzle;
   second valve means for permitting the flow of fuel vapors and liquid fuel through said second communication path when said fuel stored within said fuel tank is below said predetermined maximum level, and said second valve means inhibiting flow through said second communication path when said fuel equals or exceeds said maximum level;
   third valve means operably installed between a second end of said fill pipe and said fuel tank for permitting liquid fuel to enter said fuel tank when said first and second valve means permit flow through said first and second communication paths, respectively, and said third valve means being operable to inhibit delivery of fuel from said fill pipe to said fuel tank in response to said first and second valve means blocking flow to said first and second communication paths, respectively; and
   fourth valve means associated with said restrictor device for inhibiting the emission of fuel vapors upon withdrawal of said unleaded fuel nozzle from said nozzle opening.

2. The fuel filling system of claim 1 wherein said first valve means is a first valve assembly partially disposed within said fuel tank and having a first valve member movable between an open position for permitting the flow of said fuel vapors through said first communication path and a closed position for blocking the flow of said fuel vapors and liquid fuel through said first communication path, and wherein said second valve means is a second valve assembly partially disposed within said fuel tank and having a second valve member movable between an open position for permitting flow of said fuel vapors and liquid fuel through said second communication path and a closed position blocking the flow of fuel vapors and liquid fuel through said second communication path.

3. The fuel filling system of claim 2 wherein said first valve member is displaced to its closed position prior to said second valve member being displaced to its respective closed position.

4. The fuel filling system of claim 3 wherein said first and second valve members are adapted to move to their respective closed positions upon excessive angular displacement of said fuel tank to inhibit leakage of liquid fuel therefrom.

5. The fuel filling system of claim 4 wherein said first and second valve assemblies define a control valve assembly partially disposed within said fuel tank such that said first and second valve members are adapted to move toward their respective closed positions in response to the rising level of liquid fuel in said fuel tank and excessive angular rotation of said fuel tank.

6. The fuel filling system of claim 1 wherein said fourth valve means is a splash door assembly located between said fuel tank and said nozzle opening, said splash door assembly having biasing means for biasing a pivotably movable splash door toward a normally closed position relative to a door seal member for inhibiting evaporative loss of fuel vapors from said fill pipe upon withdrawal of said fuel nozzle from said nozzle opening, said splash door being movable to an open position upon insertion of said unleaded fuel nozzle through said nozzle opening for permitting delivery of liquid fuel to said fuel tank.

7. The fuel filling system of claim 6 wherein said third valve means is a spud valve assembly having a spud valve member which is movable relative to a valve seat between a normally closed position and an open position, said valve member being displaced toward said open position for permitting delivery of liquid fuel to said fuel tank when said level of said fuel therein is below said predetermined maximum level.

8. The fuel filling system of claim 7 wherein said spud valve member is movable from said open position to said closed position during refueling when the pressure within said fuel tank increases in response to closure of said first and second valve members for maintaining a predetermined vapor dome within said fuel tank, said spud valve member biased to be maintain in said closed position upon said excessive angular displacement of said fuel tank to inhibit leakage therefrom into said fill pipe.

9. The fuel filling system of claim 8 wherein said splash door assembly further comprises nozzle seal means located intermediate said first end of said fill pipe and said nozzle opening and which is adapted to resiliently and sealingly engage said unleaded fuel nozzle for inhibiting the escape of fuel vapors therethrough during a refueling operation.

10. The fuel filling system of claim 9 further comprising pressure relief means for relieving pressure within said fill pipe during said refueling operation with said unleaded nozzle in sealingly engagement with said nozzle seal means, and vacuum relief means for introducing air into said fill pipe behind said nozzle seal means during said refueling operation.

11. The fuel filling system of claim 1 wherein said vapor capture device is ported to said first communication path, vented to atmosphere and operably controlled by a flow control means for storing fuel vapors and selectively delivering said fuel vapors to a fuel intake system of an internal combustion engine.

12. A motor vehicle fuel delivery system comprising:
a fuel tank having a vapor dome portion in which fuel vapors are confined;
a vapor capture device remotely located from said fuel tank;
a vapor conduit fluidly interconnecting said vapor capture device to said vapor dome portion of said fuel tank above a predetermined maximum full level;
a fill pipe having a first end connected to said fuel tank for delivering fuel to said fuel tank, said fill pipe having a second end adapted to receive a fuel pump nozzle therein;
a cap-less restrictor assembly supported within said second end of said fill pipe and forming a nozzle opening adapted to permit insertion of said fuel nozzle therethrough, said restrictor assembly including a splash door assembly operable for inhibiting the evaporative loss of fuel vapors through said nozzle opening following withdrawal of said fuel nozzle, said splash door assembly having a splash door which is movable relative to a door seal member surrounding said nozzle opening between a normally closed position inhibiting evaporative vapor loss and an open position for permitting said fuel nozzle pump to pass therethrough;
a nozzle signal conduit fluidly interconnecting said vapor dome portion of said fuel tank to a portion of said filler pipe located behind said splash door assembly, said nozzle signal conduit adapted to permit a spray of liquid fuel and vapor to travel therethrough for actuating a shut-off mechanism associated with said fuel pump nozzle when the level of fuel within said fuel tank is at said predetermined maximum full level;
a control valve assembly partially disposed within said fuel tank to extend between said vapor dome and said liquid fuel, said control valve assembly including a first over-fill/roll-over valve provided for controlling the flow of fuel vapor from said vapor dome through said vapor conduit, and a second roll-over/over-fill valve for controlling flow of vapor and liquid fuel through said nozzle signal conduit, said first and second over-fill/roll-over valves independently movable between open positions permitting flow when the liquid fuel level in said fuel tank is below said maximum level and closed positions inhibiting flow when said fuel level equals or exceeds said maximum level; and
a spud valve assembly provided for operatively interconnecting a second end of said fill pipe to said fuel tank, said spud valve assembly having a spud valve adapted for movement in response to the operating position of said first and second over-fill/roll-over valves, wherein said spud valve inhibits delivery of additional fuel to said fuel tank from said fill pipe when said first and second valve members are located in their closed positions, and said spud valve permitting delivery of fuel to said fuel tank when said first and second valve members are located in their open positions, said first and second valve members are displaced to said closed positions when said fuel tank is rotated through a predetermined angular displacement to inhibit leakage of fuel from said fuel tank.

13. The fuel filling system of claim 12 wherein said first valve member is displaced to its closed position prior to said second valve member being displaced to its respective closed position.

14. The fuel filling system of claim 13 wherein said spud valve member is movable from said open position to said closed position during refueling in response to the pressure within said fuel tank increasing following closure of said first and second valve members for maintaining a predetermined vapor dome within said fuel tank, said spud valve member biased to be maintain in said closed position upon said excessive angular displacement of said fuel tank to inhibit leakage from said fuel tank into said fill pipe.

15. The fuel filling system of claim 14 wherein said splash door assembly further comprises nozzle seal means located intermediate said second end of said fill pipe and said nozzle opening and which is adapted to resiliently and sealingly engage said unleaded fuel nozzle for inhibiting the escape of fuel vapors during refueling.

16. The fuel filling system of claim 15 further comprising pressure relief means for relieving pressure within said fill pipe during refueling operation with said unleaded nozzle sealingly engaging said nozzle seal means, and vacuum relief means for introducing air into said fill pipe behind said nozzle seal means during refueling operation.

17. The fuel filling system of claim 12 wherein said vapor capture device is ported to said first communication path, vented to atmosphere and operably controlled by flow control means for storing fuel vapors and selectively delivering said fuel vapors to a fuel intake system of an internal combustion engine.

18. A fuel and vapor control system for controlling the release of fuel vapors from a vehicle fuel tank comprising:
a vapor capture device in fluid communication with said fuel tank;
first valve means provided for permitting and inhibiting flow of fuel vapors from within said fuel tank to said vapor capture device;
a fill pipe having a first end interconnected to said fuel tank for delivering fuel thereto and second end being sized to receive a fuel pump nozzle therein;
signal path means fluidly interconnecting said fuel tank to said second end of said fill pipe;
second valve means provided for permitting and inhibiting flow through said signal path means so as to control actuation of a nozzle shut-off mechanism;
third valve means associated with said first end of said fill pipe for regulating the delivery of liquid fuel to said fuel tank in response to actuation of said first and second valve means; and
fourth valve means associated with said second end of said fill pipe for inhibiting the emission of evaporative fuel vapors upon withdrawal of said nozzle therefrom.

19. The fuel and vapor control system of claim 18 wherein said first and second valve means define a control valve assembly extending partially into said fuel tank, said first valve means adapted to permit fuel vapors to flow through a vapor line to said vapor capture device when the level of liquid fuel in said fuel tank is below a predetermined maximum level, said second valve means adapted to permit fuel vapors and liquid fuel to flow to said fill pipe through said signal path means when said level is below said predetermined maximum level.

20. The fuel and vapor control system of claim 19 wherein said first and second valve means are normally open valve assemblies each having a valve member movable between a normally open position and a closed position, each of said first and second valve members being moved to said closed position in response to said level of liquid fuel within said fuel tank equalling or exceeding said predetermined maximum level.

21. The fuel and vapor control system of claim 20 wherein each of said first and second valve members move to said closed position when said fuel tank is angularly displaced for inhibiting leakage of fuel from said fuel tank.

22. The fuel and vapor control system of claim 20 wherein said third valve means is a normally closed spud valve assembly disposed between said second end of said fill pipe and said fuel tank, said spud valve assembly having a spud valve member movable from a normally closed position toward an open position upon delivery of liquid fuel from said fill pipe when said level of fuel in said fuel tank is below said predetermined maximum level, and wherein said spud valve member moves to said closed position for inhibiting delivery of fuel to said fuel tank in response to each of said first and second valve members being displaced to their respective closed position.

23. The fuel and vapor control system of claim 19 wherein said fourth valve means is a cap-less restrictor assembly supported within said second end of said fill pipe and forming a nozzle opening sized to permit receipt of an unleaded fuel nozzle therethrough, said capless restrictor assembly including a normally closed door assembly having a splash door which is pivotably movable from a normally closed position for inhibiting release of evaporative fuel vapors to the atmosphere and a second position for permitting the delivery of unleaded fuel from said nozzle into said fill pipe.

24. The fuel and vapor control system of claim 23 further comprising nozzle seal means located intermediate said second end of said fill pipe and said nozzle opening for sealingly engaging said unleaded nozzle prior to insertion of said nozzle through said nozzle opening of said restrictor.

25. A fuel delivery and vapor control system for a motor vehicle comprising:
 a fuel tank;
 a vapor capture device in fluid communication with said fuel tank;
 first valve means for controlling the flow of fuel vapors from said fuel tank to said vapor capture device;
 a fill pipe interconnected to said fuel tank for delivering fuel dispensed from a fuel pump nozzle to said fuel tank;
 a conduit providing a fluid communication passage between said fuel tank and a portion of said fill pipe;
 second valve means for controlling the actuation of a nozzle shut-off mechanism in response to flow through said conduit;
 third valve means for controlling the delivery of fuel to said fuel tank; and
 fourth valve means for inhibiting the release of fuel vapors upon withdrawal of said fuel pump nozzle from said fill pipe.

26. The fuel delivery and vapor control system of claim 25 wherein said first valve means is adapted to permit fuel vapors to flow through a vapor line to said vapor capture device when the level of liquid fuel in said fuel tank is below a predetermined maximum level, and said second valve means is adapted to permit fuel vapors and liquid fuel to flow into said fill pipe through said conduit when said liquid fuel level is below said predetermined maximum level.

27. The fuel delivery and vapor control system of claim 26 wherein said first and second valve means are normally open valve assemblies each having a valve member movable between a normally open position and a closed position, each of said first and second valve members being moved to said closed position in response to said level of liquid fuel within said fuel tank exceeding said predetermined maximum level.

28. The fuel delivery and vapor control system of claim 27 wherein each of said first and second valve members move to its respective closed position when said fuel tank is angularly displaced for inhibiting leakage of fuel from said fuel tank.

29. The fuel delivery and vapor control system of claim 26 wherein said third valve means is a spud valve assembly disposed between said fill pipe and said fuel tank, said spud valve assembly having a spud valve member movable from a normally closed position toward an open position upon delivery of liquid fuel from said fill pipe when said level of fuel in said fuel tank is below said predetermined maximum level, and wherein said spud valve member moves to said closed position for inhibiting delivery of fuel to said fuel tank in response to each of said first and second valve members being displaced to their respective closed position.

30. The fuel delivery and vapor control system of claim 25 wherein said fourth valve means is a restrictor assembly supported within a distal end of said fill pipe to form a nozzle opening that is sized to permit receipt of an unleaded fuel nozzle, said restrictor assembly including a splash door which is pivotably movable from a normally closed position for inhibiting release of fuel vapors to the atmosphere and an opened position for permitting the delivery of fuel from said nozzle into said fill pipe.

* * * * *